(12) United States Patent
Parnin

(10) Patent No.: US 10,066,507 B1
(45) Date of Patent: Sep. 4, 2018

(54) TURBINE ENGINE LUBRICATION SYSTEM WITH WASH FLOW FILTER

(71) Applicant: United Technologies Corporation, Hartford, CT (US)

(72) Inventor: Francis Parnin, Suffield, CT (US)

(73) Assignee: United Technologies Corporation, Farmington, CT (US)

( * ) Notice: Subject to any disclaimer, the term of this patent is extended or adjusted under 35 U.S.C. 154(b) by 637 days.

(21) Appl. No.: 14/618,508

(22) Filed: Feb. 10, 2015

(51) Int. Cl.
*F01D 25/20* (2006.01)
*B01D 27/10* (2006.01)
*F01M 1/10* (2006.01)
*B01D 27/14* (2006.01)

(52) U.S. Cl.
CPC .......... *F01D 25/20* (2013.01); *B01D 27/142* (2013.01); *F01M 1/10* (2013.01); *B01D 27/103* (2013.01); *B01D 27/108* (2013.01); *F01M 2001/1021* (2013.01)

(58) Field of Classification Search
CPC .. B01D 20/0059; B01D 27/10; B01D 27/108; B01D 27/105; B01D 27/146; B01D 27/148; B01D 27/142; B01D 35/14; B01D 35/157; B01D 35/1475; B01D 35/147; F01M 2001/1021
USPC ................. 210/167.09, 167.04, 433.1, 434
See application file for complete search history.

(56) References Cited

U.S. PATENT DOCUMENTS

| | | | |
|---|---|---|---|
| 4,003,836 A | 1/1977 | Stearns et al. | |
| 4,905,644 A * | 3/1990 | Masclet | B01D 35/147 123/196 A |
| 5,116,362 A * | 5/1992 | Arline | F02C 7/236 417/203 |
| 5,121,599 A * | 6/1992 | Snyder | F01D 25/20 184/6.11 |
| 5,667,051 A * | 9/1997 | Goldberg | F02C 7/32 192/85.01 |
| 6,651,441 B2 * | 11/2003 | Reuter | F01D 25/20 417/292 |
| 6,810,674 B2 | 11/2004 | Clements | |
| 7,886,875 B2 | 2/2011 | Shevchencko et al. | |
| 8,119,002 B2 * | 2/2012 | Schiavon | B01D 29/21 210/323.2 |
| 8,480,885 B2 * | 7/2013 | Bryson | B01D 27/103 210/130 |
| 2007/0264133 A1 | 11/2007 | Schwarz et al. | |
| 2008/0121376 A1 | 5/2008 | Schwarz et al. | |
| 2011/0061835 A1 * | 3/2011 | Brun | F02C 7/224 165/100 |
| 2011/0302903 A1 * | 12/2011 | Veilleux, Jr. | F01D 17/16 60/39.08 |
| 2012/0085528 A1 | 4/2012 | Schwarz et al. | |
| 2012/0234014 A1 * | 9/2012 | Reuter | F02C 7/236 60/773 |

(Continued)

OTHER PUBLICATIONS

Derek Purchas and Ken Sutherland, Handbook of Filter Media: Chapter 8, 2002, Elsevier, Second edition, pp. 307-364.*

*Primary Examiner* — Andrew Nguyen
*Assistant Examiner* — Stephanie Cheng
(74) *Attorney, Agent, or Firm* — O'Shea Getz P.C.

(57) ABSTRACT

An assembly is provided for a turbine engine. This turbine engine assembly includes a turbine engine component and a lubrication system. The lubrication system directs lubricant through the turbine engine component. The lubrication system includes a wash flow filter.

12 Claims, 4 Drawing Sheets

(56) References Cited

U.S. PATENT DOCUMENTS

2012/0234015 A1* 9/2012 Reuter .................... F02C 9/263
                                                          60/776
2014/0076661 A1   3/2014 Xu
2015/0089936 A1* 4/2015 Mears .................... F15B 21/041
                                                          60/453

* cited by examiner

TURBINE ENGINE LUBRICATION SYSTEM WITH WASH FLOW FILTER

BACKGROUND OF THE INVENTION

1. Technical Field

This disclosure relates generally to a turbine engine and, more particularly, to a lubrication system for a turbine engine.

2. Background Information

Various systems are known in the art for lubricating and cooling components of a turbine engine. One such lubrication system includes a fine filter and a coarse filter. The fine filter filters lubricant during nominal operation. The coarse filter is configured in a bypass around the fine filter, and filters the lubricant where the fine filter becomes clogged. For example, where the fine filter is clogged and causes a pressure buildup, a valve in the bypass may open and thereby allow the lubricant to bypass the clogged filter. Typically, the fine filter and the coarse filter are configured in a single module. Therefore, both filters are typically replaced when one become clogged. Even where the fine filter is discretely replaceable, the coarse filter is typically also replaced as particulates collect therewith as the clogged fine filter is bypassed.

There is a need in the art for an improved lubrication system for a turbine engine.

SUMMARY OF THE DISCLOSURE

According to an aspect of the invention, an assembly is provided for a turbine engine. This turbine engine assembly includes a turbine engine component and a lubrication system. The lubrication system directs lubricant through the turbine engine component, and includes a wash flow filter.

According to another aspect of the invention, another assembly is provided for a turbine engine. This turbine engine assembly includes a lubricant source, a first turbine engine component, a second turbine engine component and a filter. The filter includes a filter element, a first flow path and a second flow path. The first flow path extends along the filter element and is fluidly coupled with the first turbine engine component. The second flow path extends through the filter element and is fluidly coupled with the second turbine engine component.

According to still another aspect of the invention, another assembly is provided for a turbine engine. This turbine engine assembly includes a lubricant source, a turbine engine component and a filter. The filter includes a filter element, a first flow path and a second flow path. The first flow path extends along the filter element. The second flow path extends through the filter element. The first flow path and the second flow path are configured in parallel between the lubricant source and the turbine engine component.

A second filter may be included and fluidly coupled between the first flow path and the turbine engine component. The second filter may be configured in parallel with the second flow path.

A valve may be included and fluidly coupled between the second flow path and the turbine engine component. The valve may be configured in parallel with the first flow path.

The wash flow filter may include a filter element, a first flow path and a second flow path. The first flow path may extend along the filter element. The second flow path may extend through the filter element.

The turbine engine component may be fluidly coupled with and downstream of the first flow path.

A second turbine engine component may be included and fluidly coupled with and downstream of the second flow path. The turbine engine component and the second turbine engine component may be configured in parallel.

The turbine engine component may be fluidly coupled with and downstream of the second flow path.

A flow regulator may be included and configured to selectively direct lubricant through the first flow path and/or the second flow path.

The flow regulator may be configured as or otherwise include a valve.

A second filter may be included and fluidly coupled with and downstream of the first flow path.

The second filter may be configured in parallel with the second flow path.

The second filter may be operable to filter smaller particulates than the wash flow filter.

The wash flow filter may include divergent first and second flow paths. The wash flow filter may also include a filter element inline with the second flow path.

The lubrication system may include a lubricant reservoir and/or a lubricant gutter fluidly coupled with and upstream of the wash flow filter.

The lubrication system may include a lubricant pump fluidly coupled with and upstream of the wash flow filter.

The turbine engine component may be configured as or otherwise include a bearing.

The turbine engine component may be configured as or otherwise include a heat exchanger.

The lubrication system may include a lubricant reservoir and/or a lubricant gutter fluidly coupled with and downstream of the wash flow filter.

The foregoing features and the operation of the invention will become more apparent in light of the following description and the accompanying drawings.

DETAILED DESCRIPTION OF THE INVENTION

Figure 1:
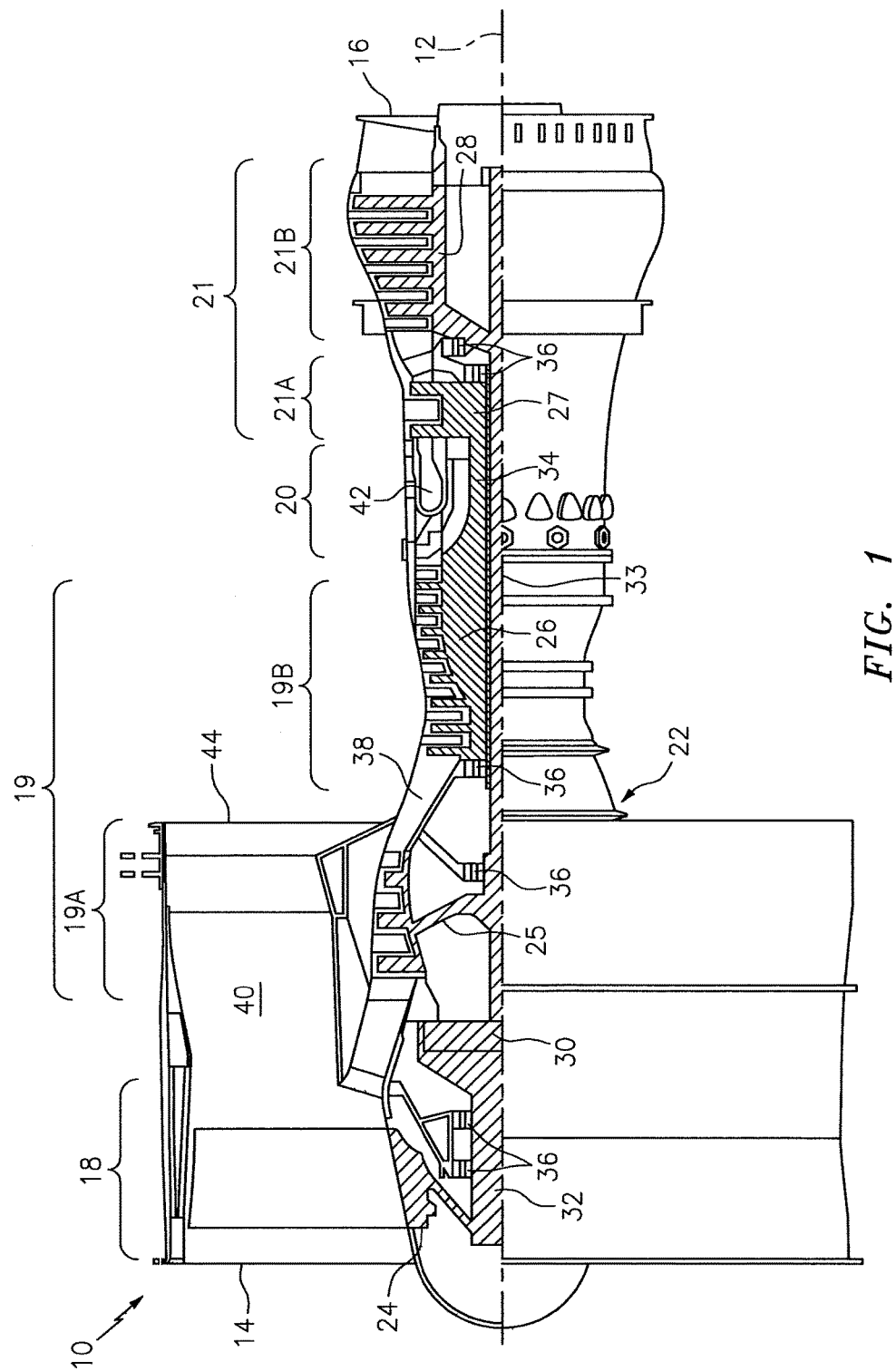
FIG. 1 is a side cutaway illustration of a geared turbine engine.

FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC)

section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

Figure 2:
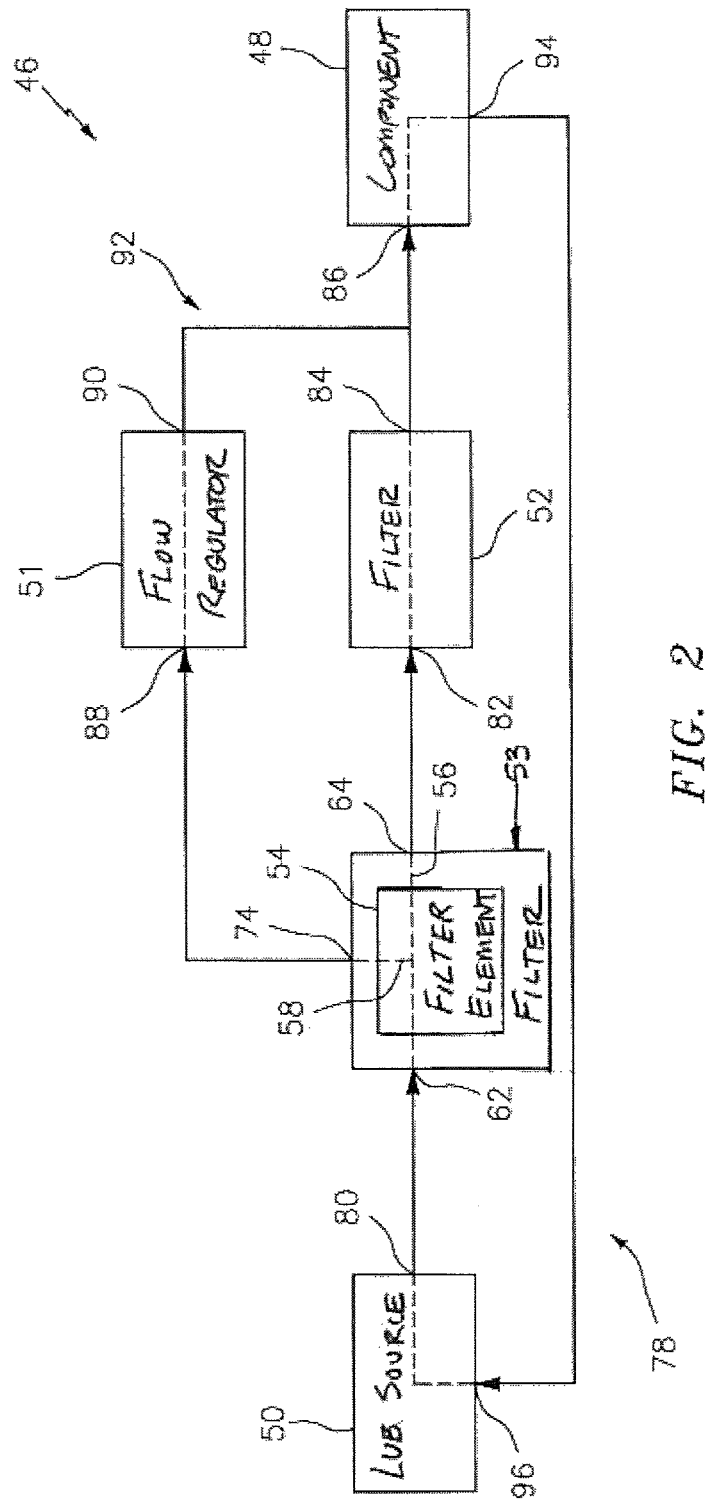
FIG. 2 is a schematic illustration of a system for directing lubricant to or through at least one component arranged with the turbine engine.

FIG. 2 is a schematic illustration of a system 46 for directing lubricant to or through at least one component 48 of the turbine engine 10. This lubrication system 46 includes a lubricant source 50, a flow regulator 51 and a plurality of lubricant filters 52 and 53.

The turbine engine component 48 may be configured as or include a bearing. Examples of such a bearing include, but are not limited to, one of the shaft support bearings 36 or a bearing (e.g., journal bearing) of the gear train 30. The turbine engine component 48 may be configured as or include other components of the gear train 30, for example where the lubricant lubricates one or more of gears therein. The turbine engine component 48 may be configured as or include a component of an accessory gearbox for the turbine engine 10. The turbine engine component 48 may alternatively be configured as or include a manifold or a heat exchanger such as, for example, a lubricant-to-air heat exchanger or a lubricant-to-fuel heat exchanger. The lubrication system 46 of the present disclosure, however, is not limited to directing lubricant through or to the foregoing exemplary turbine engine components.

The lubricant source 50 may be configured as or include a lubricant reservoir such as, for example, an oil tank. The lubricant source 50 may be configured as or include a lubricant gutter. Such a gutter may be arranged within the turbine engine 10 to collect lubricant discharged from the gear train 30, or another component of the turbine engine 10. The lubricant source 50 may alternatively be configured as or include a pump or other device for propelling the lubricant through one or more components in the loop 78. The lubrication system 46 of the present disclosure, of course, is not limited to the foregoing exemplary lubrication source configurations.

The flow regulator 51 may be configured as or include a valve such as, for example, a pressure actuated valve. The flow regulator 51, however, may alternatively be configured as another type of fluid flow regulation device such as, for example, a pump.

The filter 53 includes at least one filter element 54. This filter element 54 may be a filter screen, mesh or any other type of porous/perforated material operable to filter particulates out of lubricant flowing therethrough. The filter element 54 and, thus, the filter 53 may be configured as a "course" filter whereas the filter 52 may be configured as a "fine" filter. For example, pores/perforations in the filter 52 may be smaller than pores/perforations in the filter element 54 such that the filter 52 may strain out smaller particulates than the filter element 54. However, the present disclosure is not limited to such an arrangement. In other embodiments, for example, both filters 52 and 53 may be configured with the same pore/perforation size. In still other embodiments, the pores/perforations in the filter 52 may be larger than the pores/perforations in the filter element 54; e.g., the filter 52 may be a course filter and the filter 53 may be a fine filter.

Figure 3:
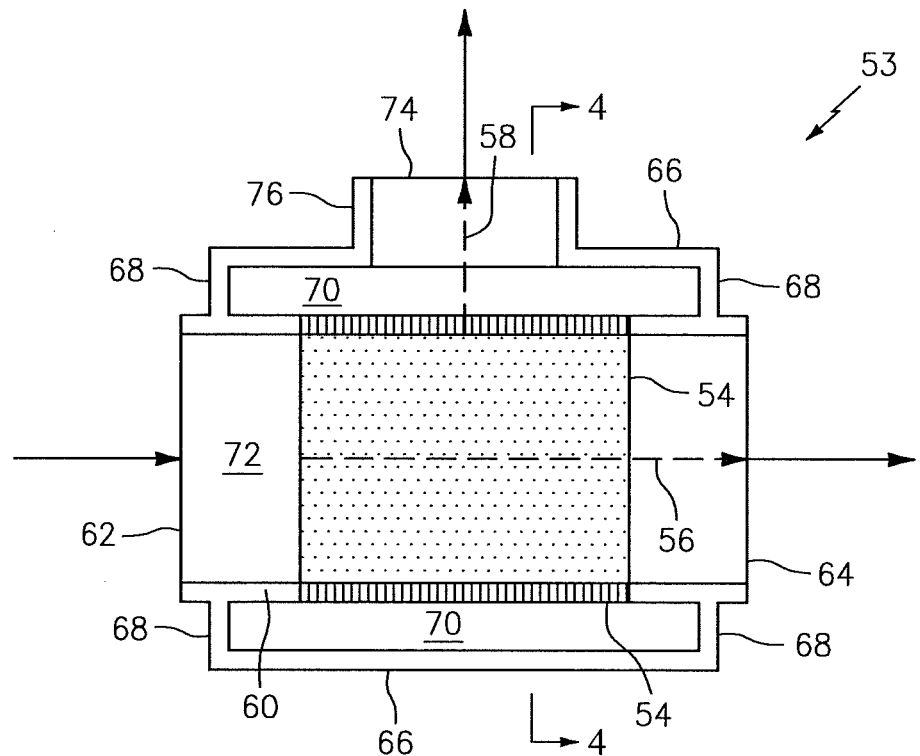
FIG. 3 is a schematic side sectional illustration of a lubricant filter.
Figure 4:
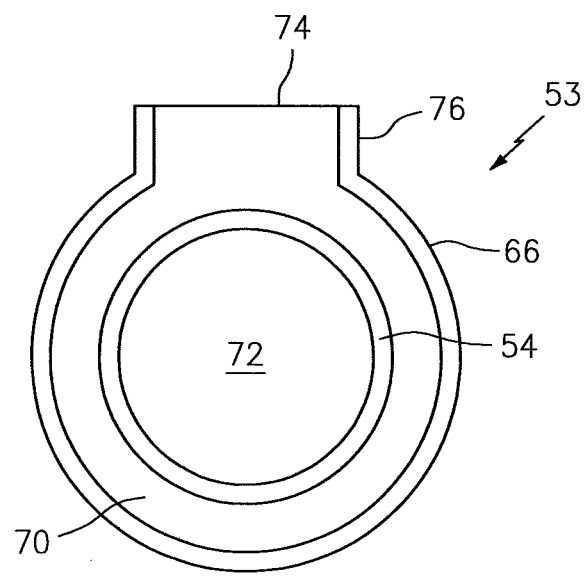
FIG. 4 is a schematic cross-sectional illustration of the lubricant filter.

The filter 53 is configured with divergent first and second flow paths 56 and 58, where the filter element 54 is arranged inline with the second flow path 58. The filter 53 illustrated in FIGS. 3 and 4, for example, is configured as a wash-flow filter. A tubular sidewall 60 of the filter 53 extends longitudinally (e.g., axially) along a centerline from an inlet 62 to a first outlet 64. A portion of the sidewall 60 may be perforated or porous so as to than the filter element 54 as an integral part of the sidewall 60. Alternatively, the filter element 54 may be mated with (e.g., attached to) the sidewall 60 and aligned to cover or plug and thereby filter lubricant that flows through at least one aperture in the sidewall 60.

The filter 53 is surrounded by an enclosure 66 (e.g., a tubular sleeve). Ends 68 of this enclosure 66 are connected to lateral (e.g., radial) exterior portions of the sidewall 60. The enclosure 66 thereby forms a (e.g., annular) cavity 70 that is fluidly coupled with a bore 72, formed within the sidewall 60, through the pores/perforations in the filter element 54. The cavity 70 is also fluidly coupled with a second outlet 74 formed by a conduit 76, which may extend laterally (e.g., radially) out from the enclosure 66. The cavity 70 thereby fluidly couples the bore 72 with the outlet 74. The conduit 76 and the outlet 74, of course, may be located elsewhere in other filter 53 embodiments.

With the foregoing filter 53 configuration, the first and the second flow paths 56 and 58 diverge from one another at the filter element 54. The first flow path 56 extends longitudinally within the bore 72 and along (e.g., adjacent) the filter element 54 to the first outlet 64, without extending through the filter element 54. The second flow path 58 extends laterally through the filter element 54 and then through the cavity 70 and the conduit 76 to the second outlet 74.

Referring again to FIG. 2, the lubrication system components 50-53 and the turbine engine component 48 may be fluidly coupled in a closed loop 78 such that the lubricant is circulated within the lubrication system 46. For example, an outlet 80 of the lubricant source 50 is fluidly coupled with the inlet 62. The first outlet 64 is fluidly coupled with an inlet 82 of the filter 52. An outlet 84 of the filter 52 is fluidly coupled with an inlet 86 (e.g., an injection nozzle, etc.) to the turbine engine component 48. The second outlet 74 is fluidly coupled with an inlet 88 of the flow regulator 51. An outlet 90 of the flow regulator 51 is also fluidly coupled with the inlet 86. The first flow path 56 and the filter 52 therefore are configured in parallel with the filter element 54, the second flow path 58 and the flow regulator 51. In this manner, the second flow path 58 and the flow regulator 51 form a bypass 92 around the first flow path 56 and the filter 52. An outlet 94 (e.g., a gutter, etc.) from the turbine engine component 48 may be fluidly coupled with an inlet 96 of the lubricant source 50.

The above-described fluid couplings between the components 48 and 50-53 may be made (e.g., directly) through one or more fluid conduits. One or more of the fluid couplings between the components 48 and 50-53 may also be made (e.g., indirectly) through one or more of other components. These other components may include one or more additional lubricant conditioning devices (e.g., filters, heat exchangers, etc.), lubricant monitoring devices (e.g., chip detectors, pressure sensors, temperature sensors, etc.), lubrication system components (e.g., reservoirs, gutters, manifolds, pumps, valves, etc.) and/or turbine engine components (e.g., heat exchangers, bearings, etc.).

The lubrication system 46 of FIG. 2 may be operated in several different modes of operation. During a first mode, the flow regulator 51 (e.g., valve) may be operated so as to close the bypass 92. Thus, the lubricant is directed from the lubricant source 50 to the turbine engine component 48 through the filter 52, but not through the filter element 54.

Under certain conditions, particulates (e.g., metal chips and/or other debris) may be deposited into the lubricant. These particulates may partially or fully clog the filter 52, which may reduce or stop lubricant flow through the filter 52. A resulting increased pressure drop across the filter 52 may cause the flow regulator 51 to at least partially or fully open the bypass 92 during a second mode. At least some of the lubricant may thereby bypass the clogged filter 52 and maintain a minimum lubricant flow to the turbine engine component 48. It is worth noting, although the clogged filter 52 is partially or completely bypassed, the lubricant directed to the turbine engine component 48 is still filtered since this bypass lubricant flows through the filter element 54. The bypass 92 therefore may allow for the turbine engine 10 to continue operation for an extended period of time.

It is worth noting, where the filter 52 becomes clogged, the filter 52 may subsequently be repaired or replaced without removing the filter 53. For example, after the repaired or replacement filter 52 is installed, particulates which may have accumulated on the filter element 54 may be washed away as lubricant one again flows through the first flow path 56 of the filter 53 and the bypass 92 is closed. More particularly, the restored flow of lubricant through the first flow path 56 may wash particulates off of the filter element 54; thus, the filter 53 may be self-cleaning. Of course, in some circumstances, it both filters 52 and 53 may be replaced.

Figure 5:
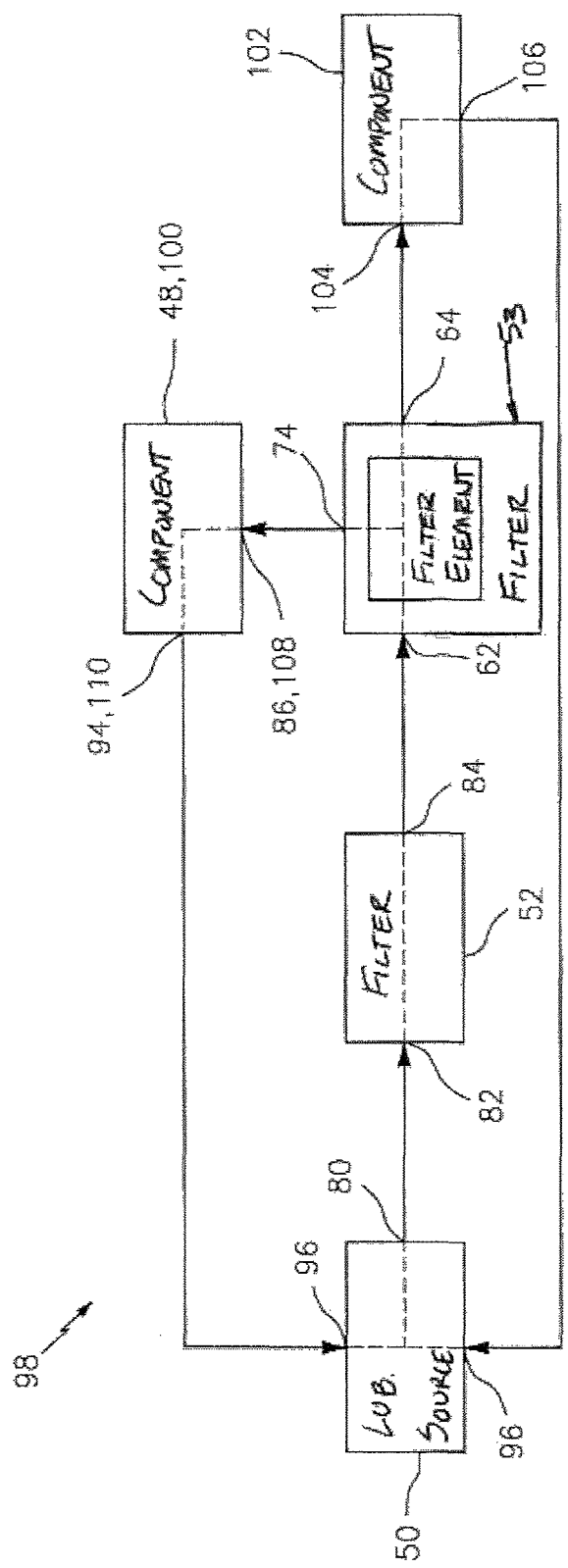
FIG. 5 is a schematic illustration of another system for directing lubricant to or through a plurality of components arranged with the turbine engine.

FIG. 5 is a schematic illustration of another system 98 for directing lubricant to or through a plurality of components 100 and 102. A first of these components (e.g., the component 100) may be configured as the turbine engine component 48. A second of the components (e.g., the component 102) may be configured as another turbine engine component or another lubrication system component such as, for example, a reservoir or gutter.

Similar to the lubrication system 46 of FIG. 2, the lubrication system 98 includes the lubricant source 50 (e.g., a pump) and the lubricant filters 52 and 53. Here, the filter 52 may be configured as the "coarse" filter and the filter 53 may be configured as the "fine" filter; however, the present disclosure is not limited thereto. Of course, the lubrication system 98 may also include one or more additional components other than those described herein.

The outlet 80 is fluidly coupled with the inlet 82. The outlet 84 is fluidly coupled with the inlet 62. The first outlet 64 is fluidly coupled with an inlet 104 to the second component 102. An outlet 106 of the second component 102 may be fluidly coupled with the inlet 96. The second outlet 74 is fluidly coupled with an inlet 108 to the first component 100; e.g., the inlet 86. An outlet 110 from the first component 100 (e.g., the outlet 94) is fluidly coupled with the inlet 96 or another inlet of the lubricant source 50. The first and the second components 100 and 102 therefore are configured in parallel between the filter 53 and the lubricant source 50.

The turbine engine components described above may be any component configured with the turbine engine 20. The components of the lubrication system 46, 98 therefore are also considered to be turbine engine components unless expressly indicated otherwise.

The lubrication system 46, 98 may be included in various turbine engines other than the one described above. The lubrication system 46, 98, for example, may be included in a geared turbine engine where a gear train connects one or more shafts to one or more rotors in a fan section, a compressor section and/or any other engine section. Alternatively, the lubrication system 46, 98 may be included in a turbine engine configured without a gear train. The lubrication system 46, 98 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a turbine engine, comprising:
   a turbine engine component;
   a lubrication system for directing lubricant through the turbine engine component, the lubrication system including a wash flow filter, wherein the wash flow filter comprises a filter element, a first flow path through the wash flow filter extending along, without extending through, the filter element, and a second flow path through the wash flow filter extending through the filter element;
   a flow regulator configured to selectively direct lubricant through the first flow path and/or the second flow path; and a second filter fluidly coupled with and downstream of the first flow path, wherein the second filter is configured in parallel with the second flow path between the wash flow filter and the turbine engine component.

2. The assembly of claim 1, wherein the turbine engine component is fluidly coupled with and downstream of the first flow path.

3. The assembly of claim 1, wherein the turbine engine component is fluidly coupled with and downstream of the second flow path.

4. The assembly of claim 1, wherein the flow regulator comprises a valve.

5. The assembly of claim 1, wherein the second filter is operable to filter smaller particulates than the wash flow filter.

6. The assembly of claim 1, wherein the first and the second flow paths are divergent;
and the filter element is inline with the second flow path.

7. The assembly of claim 1, wherein the lubrication system includes a lubricant reservoir or a lubricant gutter fluidly coupled with and upstream of the wash flow filter.

8. The assembly of claim 1, wherein the lubrication system includes a lubricant pump fluidly coupled with and upstream of the wash flow filter.

9. The assembly of claim 1, wherein the turbine engine component comprises a bearing.

10. The assembly of claim 1, wherein the turbine engine component comprises a heat exchanger.

11. An assembly for a turbine engine, comprising:
a lubricant source;
a turbine engine component; and
a first filter including a filter element, a first flow path through the first filter and a second flow path through the first filter; and
a second filter downstream of the first flow path and fluidly coupled between the first filter and the turbine engine component, wherein the second filter is configured in parallel with the second flow path;
the first flow path extending along and formed by the filter element;
the second flow path extending through the filter element; and
the first flow path and the second flow path configured in parallel between an inlet of the first filter and an inlet of the turbine engine component, wherein the inlet of the first filter is fluidly coupled with the lubricant source.

12. The assembly of claim 11, further comprising a valve fluidly coupled between the second flow path and the turbine engine component, wherein the valve is configured in parallel with the first flow path.

* * * * *